(12) United States Patent
Ko et al.

(10) Patent No.: US 11,970,566 B2
(45) Date of Patent: Apr. 30, 2024

(54) METHOD OF MANUFACTURING POLYURETHANE FILTER FOAM

(71) Applicants: Hyundai Transys Inc., Seosan-si (KR); CHIN YANG CO., LTD., Yangsan-si (KR)

(72) Inventors: Jae Yong Ko, Suwon-si (KR); Seung Keon Woo, Yangsan-si (KR); Young Tae Cho, Busan (KR); Won Sug Choi, Gimhae-si (KR); Sung Yoon Lee, Busan (KR); Jae Kwang Lee, Hwaseong-si (KR); Jun Ho Song, Hwaseong-si (KR)

(73) Assignees: HYUNDAI TRANSYS INC., Seosan-si (KR); CHIN YANG CO., LTD., Yangsan-si (KR)

( * ) Notice: Subject to any disclaimer, the term of this patent is extended or adjusted under 35 U.S.C. 154(b) by 0 days.

(21) Appl. No.: 17/936,849

(22) Filed: Sep. 30, 2022

(65) Prior Publication Data
US 2023/0106042 A1 Apr. 6, 2023

(30) Foreign Application Priority Data
Oct. 1, 2021 (KR) .................. 10-2021-0131192

(51) Int. Cl.
| | | |
|---|---|---|
| B29C 44/34 | (2006.01) | |
| C08G 18/48 | (2006.01) | |
| C08G 18/72 | (2006.01) | |
| C08G 18/76 | (2006.01) | |
| C08J 9/00 | (2006.01) | |
| C08K 11/00 | (2006.01) | |

(52) U.S. Cl.
CPC ..... C08G 18/4804 (2013.01); C08G 18/7621 (2013.01); C08K 11/00 (2013.01)

(58) Field of Classification Search
None
See application file for complete search history.

(56) References Cited

U.S. PATENT DOCUMENTS

| | | | | |
|---|---|---|---|---|
| 3,879,315 A | * | 4/1975 | Watkinson | ............... C08J 9/149 |
| | | | | 521/131 |
| 5,234,967 A | * | 8/1993 | Takezawa | ................ C08J 9/144 |
| | | | | 521/131 |
| 2018/0057630 A1 | * | 3/2018 | Lim | .................... C08G 18/7671 |

FOREIGN PATENT DOCUMENTS

KR 101264620 B1 5/2013

* cited by examiner

*Primary Examiner* — Melissa A Rioja
(74) *Attorney, Agent, or Firm* — QUANTUM PATENT LAW FIRM; Seongyoune Kang

(57) ABSTRACT

Disclosed is a method of manufacturing a polyurethane filter foam having excellent air permeability, elasticity, and restoring force. In the method of manufacturing the polyurethane filter foam, the cell size of the filter foam is made regular by controlling the pressure by adjusting the diameter of the foaming head of a foaming machine, rather than adding a cell opener, cell irregularity caused by poor dispersion of the cell opener is alleviated, and air permeability, porosity, and compression set are excellent.

8 Claims, 3 Drawing Sheets

60mm head                40mm head

METHOD OF MANUFACTURING POLYURETHANE FILTER FOAM

CROSS-REFERENCE TO RELATED APPLICATION

This application claims, under 35 U.S.C. § 119(a), the benefit of priority from Korean Patent Application No. 10-2021-0131192, filed on Oct. 1, 2021, the entire contents of which are incorporated herein by reference.

BACKGROUND

(a) Technical Field

The present disclosure relates to a method of manufacturing a polyurethane filter foam having excellent air permeability, elasticity, and restoring force.

(b) Background Art

Polyurethane is a polymer that is synthesized through a polymerization reaction of a polyol and an isocyanate. When an isocyanate and water react and urea bonds are formed, carbon dioxide gas is generated. This carbon dioxide gas evaporates into polymer cells to thus form polyurethane foam.

The polyurethane foam may be classified into hard foam having a closed cell structure and soft foam having an open cell structure depending on the type of cell structure. Soft polyurethane foam has good mechanical strength (elongation, tensile strength, abrasion resistance) and has good air permeability and cushioning properties by virtue of an open cell structure, and is thus widely used for various end uses in all industrial fields, such as parts of automobiles, electric and electronic products, or daily necessities.

Polyurethane foam is manufactured by introducing a polyol and an isocyanate into a processing line for manufacturing slabstock foam. The manufactured foam is soft slab foam having a dense and uniform cell structure, and air permeability thereof is insufficient to be applied as filter foam. In order to realize urethane foam having increased air permeability, it is necessary to have cells that are as large as possible and are 100% open. However, in the case in which the cells are made larger, the foam is highly likely to collapse while a lot of gas escapes at the time point at which the foam is opened. For this reason, in the existing filter foam, foam having large cells is made in an unopened state, and then the cells are opened through a reticulation process to ensure air permeability. However, when a cell opener is included as disclosed in Korean Patent Application Publication No. 10-2018-0024933, there may be problems in that cells are irregularly formed or the foam collapses or cracks due to poor dispersion of the cell opener.

In addition, the conventional technique mainly focuses on the role of the filter foam as a support and air permeability, and is problematic in that seating sensation is lowered during sheet production and air permeability is deteriorated due to decreased restoring force. Accordingly, there is a need for filter foam having excellent seating sensation and restoring force and air permeability maintained for a long period of time using polyurethane filter foam that is excellent in elasticity and restoring force and is soft.

SUMMARY OF THE DISCLOSURE

The purpose of solving the above problems is as follows.

An object of the present disclosure is to provide a method of manufacturing polyurethane filter foam, in which the diameter of the foaming head of a foaming machine and the pressure thereof are controlled in optimal ranges, rather than adding a cell opener, and polyurethane filter foam having a regular cell size manufactured using the same.

The present disclosure provides a method of manufacturing polyurethane filter foam including preparing a foam composition including a polyol and an isocyanate, stirring the foam composition, discharging stirred foam composition through the foaming head of a foaming machine to obtain an intermediate, foaming the intermediate to obtain a foam, and forming the polyurethane filter foam using the foam, wherein the diameter of the foaming head may be about 30 mm to 45 mm.

Also, the polyol may include a first polyol having a weight average molecular weight of 2,000 g/mol to 3,000 g/mol and having 3 to 4 functional groups, a second polyol having a weight average molecular weight of 9,000 g/mol to 11,000 g/mol and having 5 to 7 functional groups, and a third polyol having a weight average molecular weight of 50 g/mol to 1,000 g/mol and having 1 to 2 functional groups.

Also, the functional groups may include a hydroxyl group or an amine group.

Also, the polyol may include an amount of about 40% to 65% by weight of the first polyol, an amount of about 25% to 50% by weight of the second polyol, and an amount of about 5% to 15% by weight of the third polyol, based on a total amount of the polyol.

Also, the starting material may include an amount of about 20 to 30 parts by weight of the isocyanate based on 100 parts by weight of the polyol.

Also, the foam composition may further include an additive including at least one selected from the group consisting of a chain extender, a crosslinking agent, a foam stabilizer, a foaming agent, a catalyst, and a heat stabilizer.

Also, the starting material may include an amount of about 1 to 3 parts by weight of the additive based on 100 parts by weight of the polyol.

Also, the discharge pressure of the foaming head may be about 4 bar to 8 bar.

BRIEF DESCRIPTION OF THE DRAWINGS

The above and other features of the present disclosure will now be described in detail with reference to certain exemplary embodiments thereof illustrated in the accompanying drawings, which are given hereinbelow by way of illustration only, and thus are not limitative of the present disclosure, and wherein.

DETAILED DESCRIPTION

Figure 1:
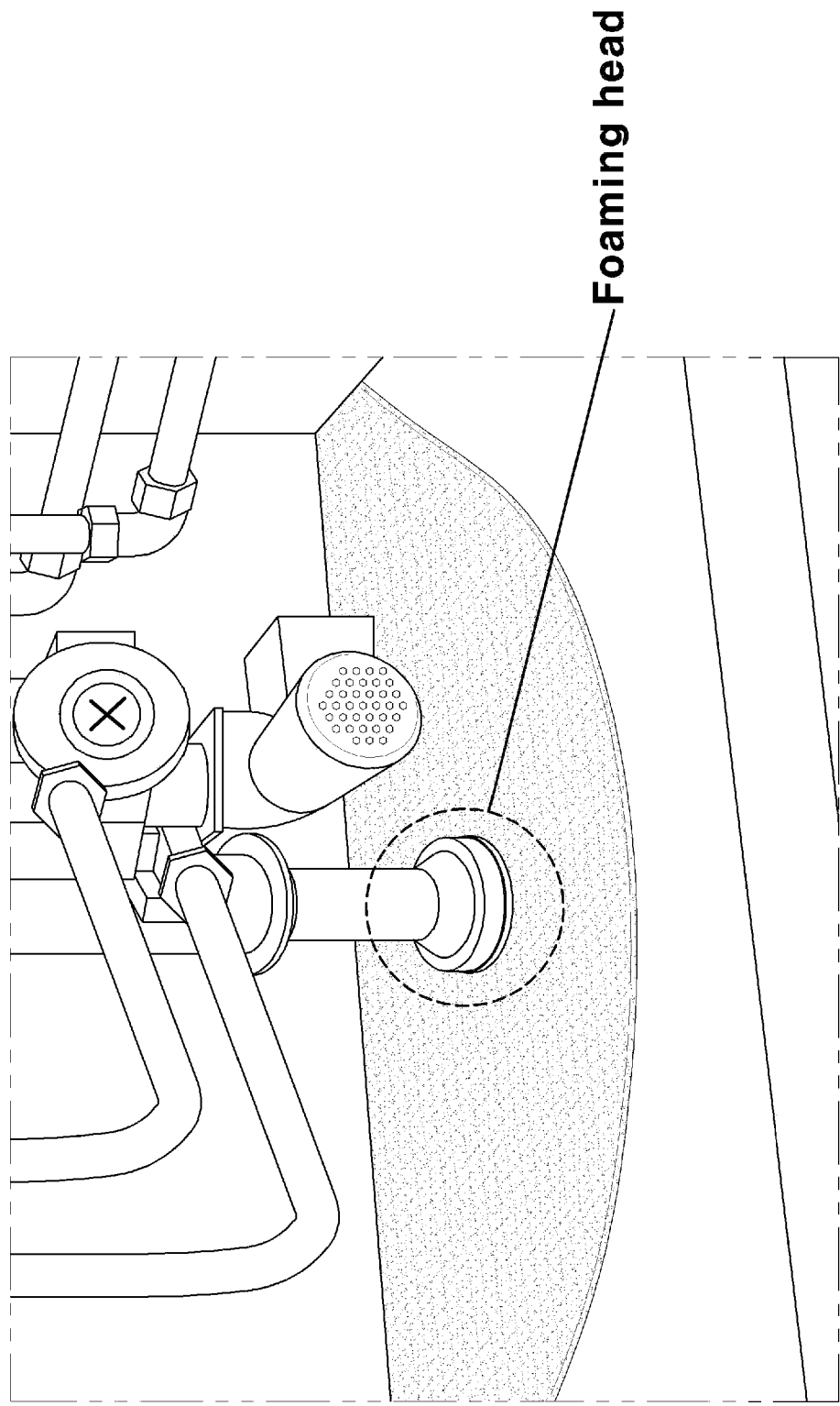
FIG. 1 shows a foaming head through which a polyurethane filter foam composition of the present disclosure is discharged.

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

The present disclosure may relate to a method of manufacturing polyurethane filter foam, including a first step of preparing a foam composition including a polyol, an isocyanate, and an additive, a second step of stirring the foam composition in a foaming machine and discharging stirred foam composition through a foaming head to obtain an intermediate, a third step of forming a foam having a shape of block by foaming the intermediate, and a fourth step of forming the polyurethane filter foam by placing the foam in a reticulation chamber and performing a reticulation process, in which the foaming head may have a diameter of about 30 to 45 mm.

Specifically, the first step of preparing the foam composition is described below. The foam composition may include first, second, and third polyols, and further include an isocyanate and an additive. More specifically, the first polyol may have a weight average molecular weight of 2,000 to 3,000 and 3 to 4 first functional groups, the second polyol may have a weight average molecular weight of 9,000 to 11,000 and 5 to 7 second functional groups, and the third polyol may have a weight average molecular weight of 50 to 1,000 and 1 to 2 third functional groups, wherein each of the functional groups may include a hydroxyl group or an amine group.

The first polyol may include a polyol to which 10 to 20% by weight of ethylene oxide (EO) is added, and the second polyol may be able to impart soft properties.

The polyol may include about 40 to 65% by weight of the first polyol, about 25 to 50% by weight of the second polyol, and about 5 to 15% by weight of the third polyol. In addition, the foam composition may further include about 20 to 30 parts by weight of the isocyanate and about 1 to 3 parts by weight of the additive based on 100 parts by weight of the polyol.

If the amount of the first polyol is less than 40 wt % or exceeds 65 wt %, it may affect the amounts of the second and third polyols, which is undesirable.

If the amount of the second polyol is less than 25 wt %, soft properties may be deteriorated, whereas if it exceeds 50 wt %, it is difficult to maintain the form of the foam, which is undesirable.

If the amount of the third polyol is less than 5 wt %, elasticity may be deteriorated, whereas if it exceeds 15 wt %, foam shrinkage may occur, which is undesirable.

The additive may include at least one selected from the group consisting of a chain extender, a crosslinking agent, a foam stabilizer, a foaming agent, a catalyst, a heat stabilizer, and combinations thereof. Preferably, the additive may include the foam stabilizer and the foaming agent. These additives may be appropriately selected and included in the foam composition within ranges of about 0.01 to 3 parts by weight, based on 100 parts by weight of the polyol.

The chain extender and the crosslinking agent may crosslink the polyurethane foam so as to prevent the polyurethane foam from collapsing, and also may play a role in opening the foam using high heat.

The chain extender may include a polyol compound commonly used in polyurethane synthesis, and examples thereof may include linear aliphatic diols such as ethylene glycol, propylene glycol, 1,3-propanediol, 1,4-butanediol, 1,6-hexanediol, and neopentyl glycol, alicyclic diols such as 1,4-cyclohexane dimethanol, hydrogenated bisphenol A, and tricyclodecanedimethanol, aromatic diols such as bisphenol A, xylylene diol, and hydroquinone diethyl ether, polyether glycols such as diethylene glycol, triethylene glycol, polyethylene glycol, polypropylene glycol, polytrimethylene glycol, and polytetramethylene glycol, polyols such as trimethylolpropane, trimethylolethane, glycerin, hexanetriol, pentaerythritol, and sorbitol, polyester polyols such as polyethylene adipate and polytetramethylene adipate, polycaprolactone polyols, polycarbonate polyols, polybutadiene polyols, and castor oil, which may be used alone or in combination of two or more thereof.

The crosslinking agent may include an organic peroxide, examples of which may include dialkyl peroxide, peroxyketal, peroxyester, peroxy monocarbonate, diacryl peroxide, peroxy dicarbonate, hydroperoxide, ketone peroxide, dicumyl peroxide, etc., which may be used alone or in combination of two or more thereof.

The foam stabilizer may control the formation of cells having a uniform shape and size while preventing the cells from being united or destroyed when cells are formed inside the polyurethane foam. The foam stabilizer is commonly used in the art and is not particularly limited in the present disclosure, and a silicone-based foam stabilizer may be typically used. The silicone-based foam stabilizer may be at least one selected from among polysiloxane and derivatives thereof. The foam stabilizer may be used in an amount of about 0.01 to 3 parts by weight, preferably 0.1 to 3 parts by weight, based on 100 parts by weight of the polyol. Here, if the amount of the foam stabilizer is too small, the foam may be non-uniformly formed, whereas if the amount thereof is too large, the foam may shrink and flame retardant properties thereof may be deteriorated, which is undesirable.

As the foaming agent, in consideration of various properties required of the foam, any known foaming agent component conventionally used for a soft polyurethane foam composition may be appropriately selected and used. The foaming agent may include typically water, and also, at least one selected from among methylene chloride, n-butane, isobutane, n-pentane, isopentane, dimethyl ether, acetone, carbon dioxide, and the like may be used. These foaming agents may be appropriately selected and used in accordance with known usage methods and depending on the required density and other characteristics of the foam. The amount of the foaming agent that is used is not particularly limited, but may fall within a range of about 1 to 3 parts by weight based on 100 parts by weight of the polyol.

The catalyst may promote reaction between the polyol and the isocyanate compound. The catalyst may include at least one selected from among amine catalysts such as triethylene diamine, triethyl amine, N-methylmorpholine, N-ethyl morpholine, and the like, and organotin catalysts such as stannous octoate, dibutyltin dilaurate (DBTDL), and the like. The catalyst may be used in an amount of about 0.01 to 10 parts by weight, preferably about 0.5 to 5 parts by weight, based on 100 parts by weight of the polyol. If the amount of the catalyst is too small, the reaction may be delayed and thus curing failure may occur, whereas if the amount of the catalyst is too large, the foam may crack or shrink.

Next, the second step of stirring the foam composition in a foaming machine and discharging the stirred foam composition through a foaming head to obtain an intermediate is described.

The method of manufacturing the polyurethane filter foam according to the present disclosure obviates the need to use a cell opener. In the process of discharging the stirred foam composition, the discharge pressure may be adjusted by controlling the diameter of the foaming head, and cell porosity (size) of about 30 to 40 PPI is ensured without using a cell opener, thereby manufacturing a polyurethane filter foam having excellent air permeability.

More specifically, the diameter of the foaming head may be about 30 to 45 mm. The discharge pressure may be controlled to about 4 to 8 bar depending on the diameter of the foaming head. The conventional manufacturing method is problematic in that the discharge pressure is set to about 1 to 3 bar and the cell opener is added, causing poor dispersion, resulting in formation of irregular cells. These problems may be solved by adjusting the discharge pressure to 4 to 8 bar by controlling the diameter of the foaming head.

Next, the third step of forming the foam having a shape of block by foaming the intermediate and the fourth step of forming the polyurethane filter foam by placing the foam in the reticulation chamber and performing the reticulation process are performed. The foam formation, reticulation, cooling, washing, and rolling processes are performed in accordance with conventionally known methods, and a detailed description thereof will be omitted.

The method of manufacturing the polyurethane filter foam according to the present disclosure makes it possible to provide polyurethane filter foam, in which the cell size of the filter foam is made regular by controlling the pressure by adjusting the head diameter of the foaming machine, rather than adding the cell opener, cell irregularity due to poor dispersion of the cell opener is alleviated, and air permeability, porosity, and compression set are excellent.

A better understanding of the present disclosure may be obtained through the following examples. These examples are merely set forth to illustrate the present disclosure and are not to be construed as limiting the scope of the present disclosure.

EXAMPLES

TABLE 1

| Category | Example 1 | Example 2 | Example 3 | Example 4 | Example 5 | Example 6 | Comparative Example 1 | Comparative Example 2 |
|---|---|---|---|---|---|---|---|---|
| First polyol | 40 | 45 | 50 | 55 | 60 | 65 | 80 | 90 |
| Second polyol | 50 | 45 | 40 | 35 | 30 | 25 | 10 | 5 |
| Third polyol | 10 | 10 | 10 | 10 | 10 | 10 | 10 | 6 |
| Additive | 1 | 1 | 1 | 1 | 1 | 1 | 1 | 1 |
| Isocyanate | 25 | 25 | 25 | 25 | 25 | 25 | 25 | 25 |

Respective polyol compositions were prepared by adding the first polyol (KPX), the second polyol (KPX), the third polyol (KPX), the additive (foam stabilizer, Evonik), and the isocyanate (T-80, Hanwha Chemical), as shown in Table 1. In addition, respective polyurethane filter foam compositions were prepared by adding the additive and the isocyanate based on 100 parts by weight of the polyol.

Test Examples

Foam was manufactured from each of the polyurethane filter foam compositions of Examples using a foaming head having the controlled diameter.

Figure 2:
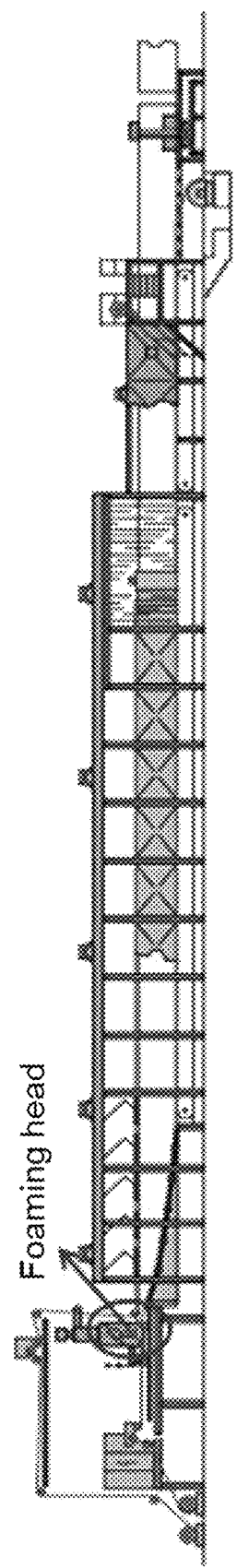
FIG. 2 shows a foaming machine used to manufacture the polyurethane filter foam of the present disclosure.
Figure 3:
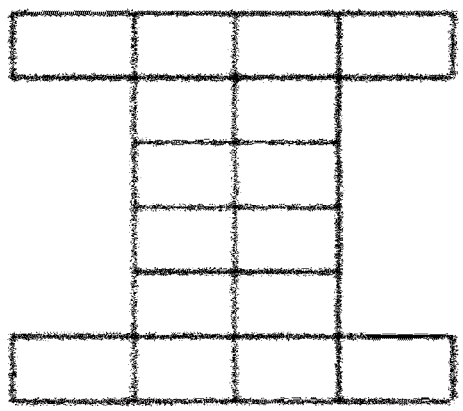
FIG. 3 shows foaming heads having different diameters according to the present disclosure.
Figure 3:
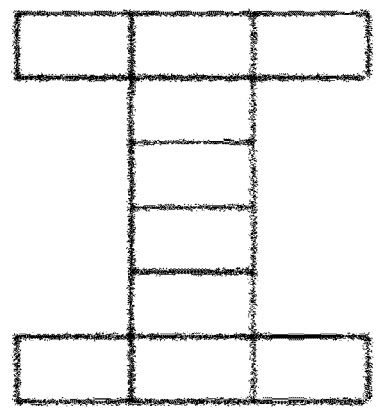
Figure 3:
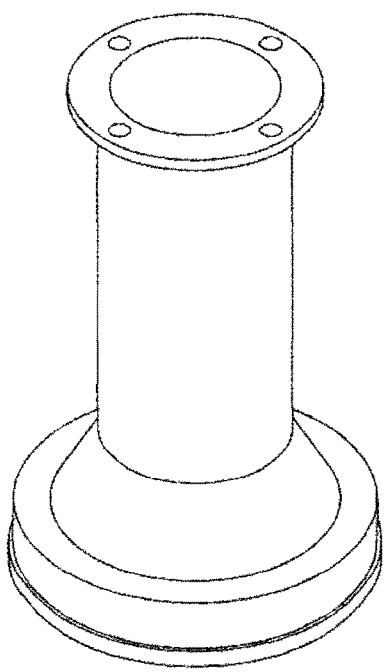
Figure 3:
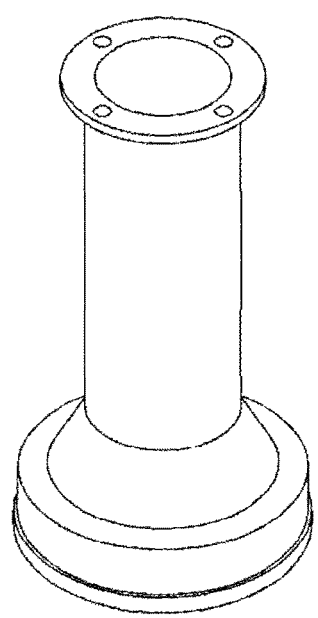

FIG. 1 shows a foaming head through which the foam composition is discharged. FIG. 2 shows a foaming machine configured to manufacture the polyurethane filter foam. FIG. 3 shows foaming heads having different diameters according to the present disclosure.

Testing was conducted by varying the pressure depending on the diameter of the foaming head.

The foaming pressure, cell porosity, air permeability, and compression set when the diameter of the foaming head is 40 mm, 30 mm, 35 mm, 50 mm, and 60 mm are shown in Tables 2, 3, 4, 5, and 6, respectively.

TABLE 2

| Category | Example 1 | Example 2 | Example 3 | Example 4 | Example 5 | Example 6 | Comparative Example 1 | Comparative Example 2 |
|---|---|---|---|---|---|---|---|---|
| Foaming head diameter (mm) | 40 | 40 | 40 | 40 | 40 | 40 | 40 | 40 |
| Foaming pressure (bar) | 4.5 | 4.5 | 4.5 | 4.5 | 4.5 | 4.5 | 4.5 | 4.5 |
| Cell porosity (PPI) | 35 | 35 | 34 | 34 | 35 | 34 | 36 | 36 |
| Air permeability (L/min) | 250 | 254 | 260 | 255 | 250 | 258 | 242 | 246 |
| Compression set (%) | 1.4 | 1.2 | 1.8 | 2.0 | 1.2 | 1.3 | 5 | 7.2 |

TABLE 3

| Category | Example 1 | Example 2 | Example 3 | Example 4 | Example 5 | Example 6 | Comparative Example 1 | Comparative Example 2 |
|---|---|---|---|---|---|---|---|---|
| Foaming head diameter (mm) | 30 | 30 | 30 | 30 | 30 | 30 | 30 | 30 |
| Foaming pressure (bar) | 8 | 8 | 8 | 8 | 8 | 8 | 8 | 8 |
| Cell porosity (PPI) | 32 | 31 | 32 | 31 | 30 | 30 | 31 | 31 |
| Air permeability (L/min) | 289 | 292 | 293 | 287 | 290 | 290 | 287 | 290 |
| Compression set (%) | 1.3 | 1.7 | 1.5 | 2.1 | 2.1 | 1.3 | 5.5 | 8.3 |

TABLE 4

| Category | Example 1 | Example 2 | Example 3 | Example 4 | Example 5 | Example 6 | Comparative Example 1 | Comparative Example 2 |
|---|---|---|---|---|---|---|---|---|
| Foaming head diameter (mm) | 35 | 35 | 35 | 35 | 35 | 35 | 35 | 35 |
| Foaming pressure (bar) | 6.5 | 6.5 | 6.5 | 6.5 | 6.5 | 6.5 | 6.5 | 6.5 |
| Cell porosity (PPI) | 32 | 33 | 32 | 33 | 32 | 32 | 32 | 32 |
| Air permeability (L/min) | 27 | 275 | 276 | 269 | 272 | 275 | 277 | 271 |
| Compression set (%) | 1.1 | 1.5 | 1.6 | 1.9 | 1.9 | 2.5 | 6.5 | 7.9 |

TABLE 5

| Category | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| Foaming head diameter (mm) | 50 | 50 | 50 | 50 | 50 | 50 | 50 | 50 |
| Foaming pressure (bar) | 3.0 | 3.0 | 3.0 | 3.0 | 3.0 | 3.0 | 3.0 | 3.0 |
| Cell porosity (PPI) | 45 | 46 | 45 | 44 | 46 | 47 | 49 | 45 |
| Air permeability (L/min) | 137 | 128 | 141 | 150 | 129 | 131 | 120 | 134 |
| Compression set (%) | 1.4 | 1.2 | 1.8 | 2.0 | 1.2 | 1.3 | 5.0 | 7.2 |

TABLE 6

| Category | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|
| Foaming head diameter (mm) | 60 | 60 | 60 | 60 | 60 | 60 | 60 | 60 |
| Foaming pressure (bar) | 1.5 | 1.5 | 1.5 | 1.5 | 1.5 | 1.5 | 1.5 | 1.5 |
| Cell porosity (PPI) | 60 | 62 | 65 | 63 | 60 | 61 | 59 | 60 |
| Air permeability (L/min) | 90 | 88 | 85 | 91 | 90 | 91 | 96 | 100 |
| Compression set (%) | 1.4 | 1.2 | 1.8 | 2.0 | 1.2 | 1.3 | 5.0 | 7.2 |

Elasticity and Restoring Force (Compression Set) of Foam

The compression set was tested under compression conditions of 50%, temperature of 70° C., and time of 22 hours.

The compression set and restoring force were improved by controlling the mixing conditions of polyols with differences in molecular weight, functional groups, and ethylene oxide (EO). With reference to Tables 2 to 4, in Examples of the present invention, the compression set could be controlled to 5% or less depending on the polyol components and the mixing ratio thereof.

Cell Porosity and Air Permeability of Foam

The pressure was increased by adjusting the head diameter of the foaming machine, whereby an effect similar to that of adding a cell opener was obtained.

Cell size and air permeability were improved by controlling the diameter of the foaming head and adjusting the foaming pressure without using a cell opener. In particular, when the diameter of the foaming head was set to 40 mm, the discharge pressure was high compared to when the head having a larger diameter was used, confirming that the cell size was increased. It was found that air permeability was improved with an increase in the cell size.

With reference to Tables 2 to 4, in Examples of the present invention, porosity was 30-40 PPI and air permeability was at least 200 L/min. In contrast, with reference to Tables 5 and 6, in Comparative Examples, porosity was 40 PPI or more and air permeability was 150 L/min or less.

As is apparent from the above description, a method of manufacturing polyurethane filter foam according to an embodiment of the present invention is effective at alleviating irregularity of cells due to poor dispersion of a cell opener that is conventionally used.

Therefore, polyurethane filter foam manufactured using the above method is advantageous because of excellent air permeability, porosity, and compression set.

The above description is merely illustrative of the technical idea of the present disclosure, and various modifications and variations will be possible without departing from the essential characteristics of the present disclosure by those skilled in the art to which the present disclosure belongs. Therefore, the embodiments disclosed in the present disclosure are not intended to limit the technical spirit of the present disclosure, but to explain the same, and the scope of the technical spirit of the present disclosure is not limited by these embodiments. The protection scope of the present disclosure should be construed by the claims, and all technical ideas within the scope equivalent thereto should be construed as being included in the scope of the present disclosure.

What is claimed is:

1. A method of manufacturing a polyurethane filter foam, comprising:
preparing a foam composition comprising a polyol component and an isocyanate;
stirring the foam composition;
discharging stirred foam composition through a foaming head of a foaming machine to obtain an intermediate;
foaming the intermediate to obtain a foam; and
forming the polyurethane filter foam with the foam,
wherein a diameter of the foaming head is about 30 mm to 45 mm; and
wherein the polyol component comprises:
a first polyol having a weight average molecular weight of about 2,000 g/mol to 3,000 g/mol and having 3 to 4 first functional groups;
a second polyol having a weight average molecular weight of 9,000 g/mol to 11,000 g/mol and having 5 to 7 second functional groups; and
a third polyol having a weight average molecular weight of 50 g/mol to 1,000 g/mol and having 1 to 2 third functional groups.

2. The method of claim 1, wherein each of the first functional groups, the second functional groups and the third functional groups comprises a hydroxyl group or an amine group.

3. The method of claim 1, wherein the polyol component comprises an amount of about 40% to 65% by weight of the first polyol, an amount of about 25% to 50% by weight of the second polyol, and an amount of about 5% to 15% by weight of the third polyol, based on a total amount of the polyol component.

4. The method of claim 1, wherein the foam composition comprises an amount of 20 to 30 parts by weight of the isocyanate based on 100 parts by weight of the polyol component.

5. The method of claim 1, wherein the foam composition further comprises an additive, and the additive comprises at least one of a chain extender, a crosslinking agent, a foam stabilizer, a foaming agent, a catalyst, a heat stabilizer or any combination thereof.

6. The method of claim 5, wherein the foam composition comprises an amount of 1 to 3 parts by weight of the additive based on 100 parts by weight of the polyol component.

7. The method of claim 1, wherein a discharge pressure of the foaming head is about 4 bar to 8 bar.

8. A foam composition for manufacturing a polyurethane filter foam through a foaming head of a foaming machine, comprising:
a polyol component and an isocyanate;
wherein a diameter of the foaming head is about 30 mm to 45 mm,
wherein the polyol component comprises:
a first polyol having a weight average molecular weight of about 2,000 g/mol to 3,000 g/mol and having 3 to 4 first functional groups;
a second polyol having a weight average molecular weight of 9,000 g/mol to 11,000 g/mol and having 5 to 7 second functional groups; and
a third polyol having a weight average molecular weight of 50 g/mol to 1,000 g/mol and having 1 to 2 third functional groups,
wherein the polyol component comprises an amount of about 40% to 65% by weight of the first polyol, an amount of about 25% to 50% by weight of the second polyol, and an amount of about 5% to 15% by weight of the third polyol, based on a total amount of the polyol.

* * * * *